H. L. BLUNCK.
CAR BRAKE EQUALIZER.
APPLICATION FILED MAY 14, 1910.
977,998.
Patented Dec. 6, 1910.
2 SHEETS—SHEET 1.
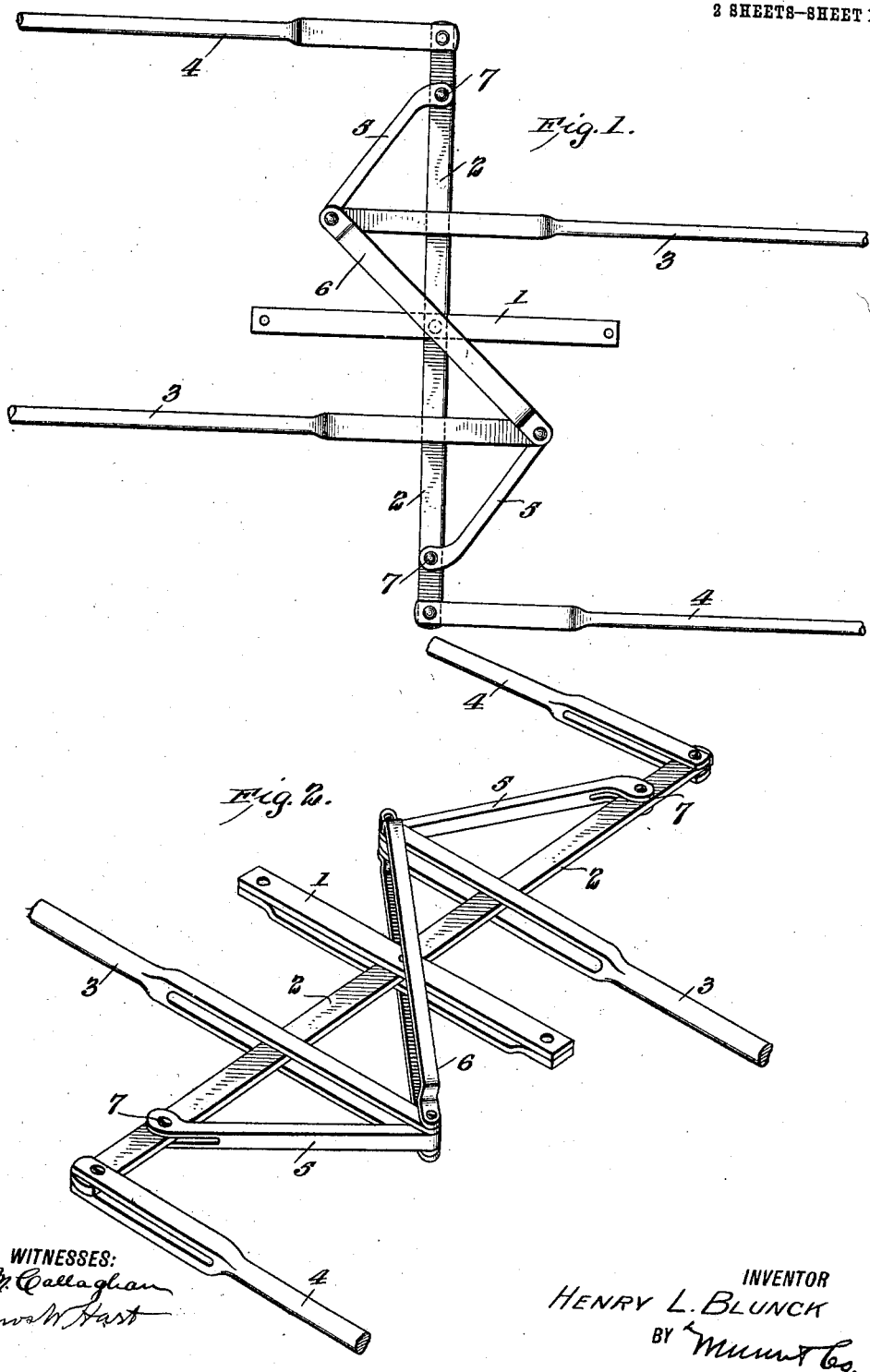
WITNESSES:
E. M. Callaghan
Anna W. Hart
INVENTOR
HENRY L. BLUNCK
BY Munn & Co.
ATTORNEYS

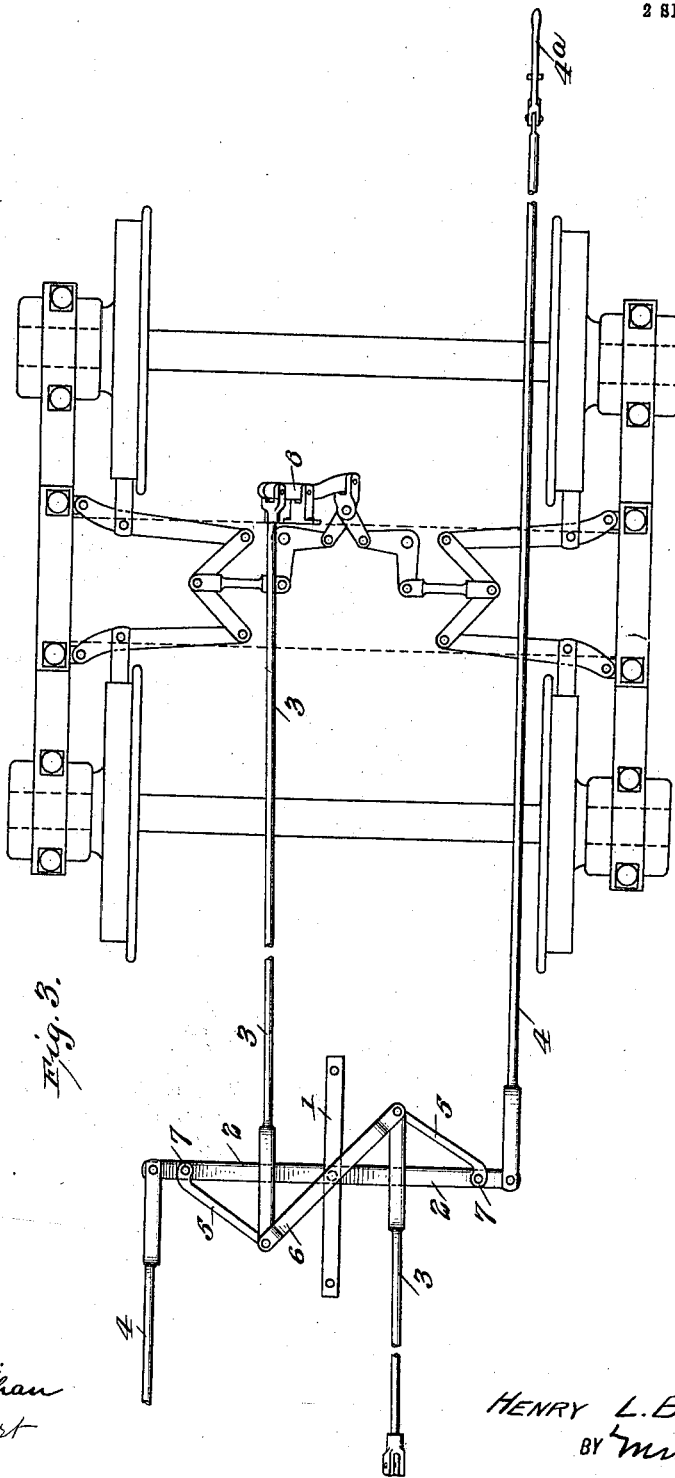

UNITED STATES PATENT OFFICE.

HENRY LEWIS BLUNCK, OF SIOUX CITY, IOWA.

CAR-BRAKE EQUALIZER.

977,998.  Specification of Letters Patent.  Patented Dec. 6, 1910.

Application filed May 14, 1910. Serial No. 561,288.

*To all whom it may concern:*

Be it known that I, HENRY LEWIS BLUNCK, a citizen of the United States, and a resident of Sioux City, in the county of Woodbury and State of Iowa, have invented an Improved Car-Brake Equalizer, of which the following is a specification.

In the ordinary brake attachment of four-wheeled car-trucks, the brake action is not duly equalized on the respective trucks. I have devised an improvement which is simple in construction and effective in use and which constitutes an addition to the ordinary brake attachment and whereby the action of the brakes of both trucks is equalized.

In the accompanying drawing Figure 1 is a plan view of the main portion of my equalizing brake attachment. Fig. 2 is a perspective view of the same. Fig. 3 is a plan view illustrating the connection of my attachment with a four-wheeled car-truck.

The numeral 1 indicates a slotted bar which may be termed a keeper, the same being in practice secured centrally to the under side of a car body parallel to its longitudinal axis. A transverse lever 2 is pivoted centrally in the slot of the keeper 1, and rods 4 are pivoted to its ends and extend in opposite directions to the ends of the car where they are pivotally connected with hand-levers 4ª or other devices adapted for operating, that is for moving, them lengthwise in order to operate the brake.

Rods or bars 5 are pivoted to the transverse lever 2 near its ends, as indicated at 7, and their opposite ends are connected by a slotted bar 6 whose parallel portions extend over and under the keeper 1, the bars 5 being arranged on opposite sides of the lever 2 and at an angle thereto, as shown.

Brake rods 3 are pivotally connected with the bars 5, 6, at their junction, and they are slotted or bifurcated in order to accommodate the lever 2 which passes through them. One of the rods 3 is pivotally connected with a lever 8—see Fig. 3—which forms part of the brake mechanism proper of a four-wheeled car-truck, and the other rod 3 extends forward and is in practice similarly connected with the brake mechanism of another truck. In other words, the rods 3 extend respectively to the front and rear trucks and are operatively connected with the brake mechanism thereof.

By this construction, arrangement, and combination of parts, I produce a brake attachment by which the action of the brakes of each truck on the four wheels thereof is equalized. In the ordinary brake attachment, which consists of a keeper 1, lever 2, and brake rods 3 pivoted directly to the lever 2, such equalization is impracticable if the brakes are set tighter at one end, that is to say, on one truck, than the other, for in such case one set of brakes will act strongly on four wheels but weakly or inefficiently on the other truck. In my invention it is immaterial if the brakes of one truck are set tighter than the other, since my equalizing attachment will adjust itself so that the rods of the other truck will pull with the same effect; in other words, the pressure on the wheels of each truck will be practically the same.

What I claim is:—

1. The improved car-brake equalizing attachment, comprising a transverse lever pivoted centrally, rods pivoted to the ends of said lever and extending in opposite directions and connected with devices adapted to be operated manually, and the equalizing attachment proper comprising bars 5 pivoted to the aforesaid lever near its ends, on opposite sides thereof, a connecting bar 6 which is pivotally attached to the inner ends of said bars 5 and extends across the lever diagonally, and brake rods pivoted at the junction of the bars 5 and the connecting bar, and extending in opposite directions for connection with the brake mechanism of front and rear trucks, substantially as described.

2. The combination with the brake mechanism of front and rear four-wheeled trucks, of the equalizing brake attachment comprising a transverse lever pivoted centrally beneath a car-body, bars 5 pivoted to said lever near its ends and extending inward at an angle thereto and on opposite sides of the same, a rigid connector pivoted to the inner ends of the bars 5, and rods 3 pivoted at the same point and extending in opposite directions to the brake mechanism of the respective trucks, substantially as described.

HENRY LEWIS BLUNCK.

Witnesses:
W. F. DUNCAN,
CHAS. H. HUNTER.